US012387472B2

(12) United States Patent
Gopal et al.

(10) Patent No.: US 12,387,472 B2
(45) Date of Patent: Aug. 12, 2025

(54) SYSTEM AND METHOD FOR LEARNING LONG-DISTANCE RECOGNITION AND PERSONALIZATION OF GESTURES (71) Applicant: Robert Bosch GmbH, Stuttgart (DE)

(72) Inventors: Sharath Gopal, Fremont, CA (US); Shubhang Bhatnagar, Champaign, IL (US); Liu Ren, Saratoga, CA (US)

(73) Assignee: Robert Bosch GmbH, Stuttgart (DE)

( * ) Notice: Subject to any disclaimer, the term of this patent is extended or adjusted under 35 U.S.C. 154(b) by 431 days.

(21) Appl. No.: 18/068,091

(22) Filed: Dec. 19, 2022

(65) Prior Publication Data
US 2024/0203104 A1 Jun. 20, 2024

(51) Int. Cl.
G06V 10/776 (2022.01)
G06V 10/44 (2022.01)
G06V 10/764 (2022.01)
G06V 10/774 (2022.01)
G06V 10/82 (2022.01)
G06V 40/20 (2022.01)

(52) U.S. Cl.
CPC ............ *G06V 10/776* (2022.01); *G06V 10/44* (2022.01); *G06V 10/764* (2022.01); *G06V 10/774* (2022.01); *G06V 10/82* (2022.01); *G06V 40/20* (2022.01)

(58) Field of Classification Search
CPC .... G06V 10/776; G06V 10/44; G06V 10/764; G06V 10/774; G06V 10/82; G06V 40/20; G06V 40/28; G06V 10/454; G06N 3/045; G06N 3/0464
See application file for complete search history.

(56) References Cited

PUBLICATIONS

"Yongxiang Zou et. al., A Transfer Learning Model for Gesture Recognition Based on the Deep Features Extracted by CNN, Oct. 2021, IEEE Transactions on Artificial Intelligence, vol. 2, Issue 5" (Year: 2021).*

(Continued)

*Primary Examiner* — Chineyere Wills-Burns
*Assistant Examiner* — Phuong Hau Cai
(74) *Attorney, Agent, or Firm* — Kathy Takeguchi; Maginot, Moore & Beck LLP (57) ABSTRACT A computer-implemented system and method relate to gesture recognition. A machine learning system is trained using a training dataset of sensor data that include a set of gestures. The training dataset includes at least a first subset that displays a first gesture. Loss data is generated based on a first loss function that includes a first cross entropy loss and a second cross entropy loss. Parameters of the machine learning system are updated based on the loss data. The machine learning system is outputted and configured for gesture recognition of the set of gestures. The machine learning system includes (i) a first subnetwork to generate feature data based on the sensor data, (ii) a second subnetwork to extract a selected patch of the feature data, and (iii) a third subnetwork to generate gesture data based on a classification of the corresponding feature data of the selected patch. The first cross entropy loss is based on a first performance of the second subnetwork in relation to the training dataset. The second cross entropy loss is based on a second performance of third subnetwork in relation to the training dataset.

20 Claims, 7 Drawing Sheets

(56) References Cited

PUBLICATIONS

Ji et al., "3D Convolutional Neural Networks for Human Action Recognition," IEEE Transactions on Pattern Analysis and Machine Intelligence, vol. 35, No. 1, Jan. 2013, doi: 10.1109/TPAMI.2012.59, pp. 221-231.

Kopuklu et al., "Real-time Hand Gesture Detection and Classification Using Convolutional Neural Networks," 2019 14th IEEE International Conference on Automatic Face & Gesture Recognition (FG 2019), arXiv:1901.10323v3 [cs.CV] Oct. 18, 2019, pp. 1-8.

Liu et al., "LD-ConGR: A Large RGB-D Video Dataset for Long-Distance Continuous Gesture Recognition," Proceedings of the IEEE/CVF Conference on Computer Vision and Pattern Recognition (CVPR) 2022, pp. 3304-3312.

Wei et al., "Dual Regression for Efficient Hand Pose Estimation," IEEE International Conference on Robotics and Automation (ICRA) 2022, May 23-27, 2022, Philadelphia, PA, USA, pp. 6430-6436.

Joze et al., "MMTM: Multimodal Transfer Module for CNN Fusion," CVPR 2020, Computer Vision Foundation, pp. 13289-13299.

Snell et al., "Prototypical Networks for Few-Shot Learning," Advances in Neural Information Processing Systems, (NeurIPS), arXiv:1703.05175v2 [cs.LG], Jun. 19, 2017, pp. 1-13.

Wang et al., "Tent: Fully Test-Time Adaptation by Entropy Minimization," 9th International Conference on Learning Representations (ICLR 2021), arXiv:2006.10726v3 [cs.LG], Mar. 18, 2021, pp. 1-15.

Mnih et al., "Recurrent Models of Visual Attention." Advances in Neural Information Processing Systems, arXiv:1406.6247v1 [cs.LG], Jun. 24, 2014, pp. 1-12.

Li et al., "Dynamic Computational Time for Visual Attention," Proceedings of the IEEE International Conference on Computer Vision Workshops, 2017, arXiv:1703.10332v3 [cs.CV], Sep. 7, 2017, pp. 1-11.

Woo et al., "CBAM: Convolutional Block Attention Module," Proceedings of the European Conference on Computer Vision (ECCV), arXiv:1807.06521v2 [cs.CV], Jul. 18, 2018, pp. 1-17.

Mittal et al., "Essentials for Class Incremental Learning," Proceedings of the IEEE/CVF Conference on Computer Vision and Pattern Recognition, arXiv:2102.09517v1 [cs.CV], Feb. 18, 2021, pp. 1-12.

\* cited by examiner

SYSTEM AND METHOD FOR LEARNING LONG-DISTANCE RECOGNITION AND PERSONALIZATION OF GESTURES

FIELD

This disclosure relates generally to computer vision, and more particularly to digital image processing with gesture recognition.

BACKGROUND

Gesture recognition systems provide intuitive user interfaces for consumers to communicate with various devices. For instance, Microsoft's Kinect is an example of a device that uses gesture recognition. However, some devices may need to perform gesture recognition from a relatively long distance, such as more than one meter away. For example, vacuuming robots typically have their onboard cameras positioned at relatively low heights such that their subjects come into view only when those subjects are more than one meter away. Unfortunately, there are a number of gesture recognition systems, which fail to recognize gestures accurately when a subject is relatively far away (e.g., greater than one meter away). These gesture recognition systems have difficulty performing gesture recognition since the gestures occupy only small spatial regions of their field-of-view (FOV) of their sensors when the subjects are more than one meter away. In addition, such gesture recognition systems may be limited to recognizing only those gestures that they learned during training and may not be able to adapt to variations of those gestures when performed by different users.

SUMMARY

The following is a summary of certain embodiments described in detail below. The described aspects are presented merely to provide the reader with a brief summary of these certain embodiments and the description of these aspects is not intended to limit the scope of this disclosure. Indeed, this disclosure may encompass a variety of aspects that may not be explicitly set forth below.

According to at least one aspect, a computer-implemented method relates to gesture recognition. The method includes training a machine learning system using a training dataset of sensor data that include a set of gestures. The training dataset includes at least a first subset that displays a first gesture and a second subset that displays a second gesture. The method includes generating loss data based on a first loss function that includes a first cross entropy loss and a second cross entropy loss. The method includes updating parameters of the machine learning system based on the loss data. The method includes outputting the machine learning system for gesture recognition of the set of gestures. The machine learning system includes (i) a first subnetwork to generate feature data based on the sensor data, (ii) a second subnetwork to extract a selected patch of the feature data, and (iii) a third subnetwork to generate gesture data based on a classification of the corresponding feature data of the selected patch. The first cross entropy loss is based on a first performance of the second subnetwork in relation to the training dataset. The second cross entropy loss is based on a second performance of third subnetwork in relation to the training dataset.

According to at least one aspect, a system for gesture recognition includes at least a processor and a non-transitory computer readable medium. The non-transitory computer readable medium is in data communication with the processor. The non-transitory computer readable medium having computer readable data including instructions stored thereon that when executed by the processor is configured to cause the processor to perform a method. The method includes training a machine learning system using a training dataset of sensor data that include a set of gestures. The training dataset including at least a first subset that displays a first gesture and a second subset that displays a second gesture. The method includes generating loss data based on a first loss function that includes a first cross entropy loss and a second cross entropy loss. The method includes updating parameters of the machine learning system based on the loss data. The method includes outputting the machine learning system for gesture recognition of the set of gestures. The machine learning system includes (i) a first subnetwork to generate feature data based on the sensor data, (ii) a second subnetwork to extract a selected patch of the feature data, and (iii) a third subnetwork to generate gesture data based on a classification of the corresponding feature data of the selected patch. The first cross entropy loss is based on a first performance of the second subnetwork in relation to the training dataset. The second cross entropy loss is based on a second performance of third subnetwork in relation to the training dataset.

According to at least one aspect, a non-transitory computer readable medium has computer readable data including instructions stored thereon that, when executed by a processor, is configured to cause the processor to perform a method. The method includes training a machine learning system using a training dataset of sensor data that include a set of gestures. The training dataset includes at least a first subset that displays a first gesture. The method includes generating loss data based on a first loss function that includes a first cross entropy loss and a second cross entropy loss. The method includes updating parameters of the machine learning system based on the loss data. The method includes outputting the machine learning system for gesture recognition of the set of gestures. The machine learning system includes (i) a first subnetwork to generate feature data based on the sensor data, (ii) a second subnetwork to extract a selected patch of the feature data, and (iii) a third subnetwork to generate gesture data based on a classification of the corresponding feature data of the selected patch. The first cross entropy loss is based on a first performance of the second subnetwork in relation to the training dataset. The second cross entropy loss is based on a second performance of third subnetwork in relation to the training dataset.

These and other features, aspects, and advantages of the present invention are discussed in the following detailed description in accordance with the accompanying drawings throughout which like characters represent similar or like parts.

DETAILED DESCRIPTION

The embodiments described herein, which have been shown and described by way of example, and many of their advantages will be understood by the foregoing description, and it will be apparent that various changes can be made in the form, construction, and arrangement of the components without departing from the disclosed subject matter or without sacrificing one or more of its advantages. Indeed, the described forms of these embodiments are merely explanatory. These embodiments are susceptible to various modifications and alternative forms, and the following claims are intended to encompass and include such changes and not be limited to the particular forms disclosed, but rather to cover all modifications, equivalents, and alternatives falling within the spirit and scope of this disclosure.

Figure 1:
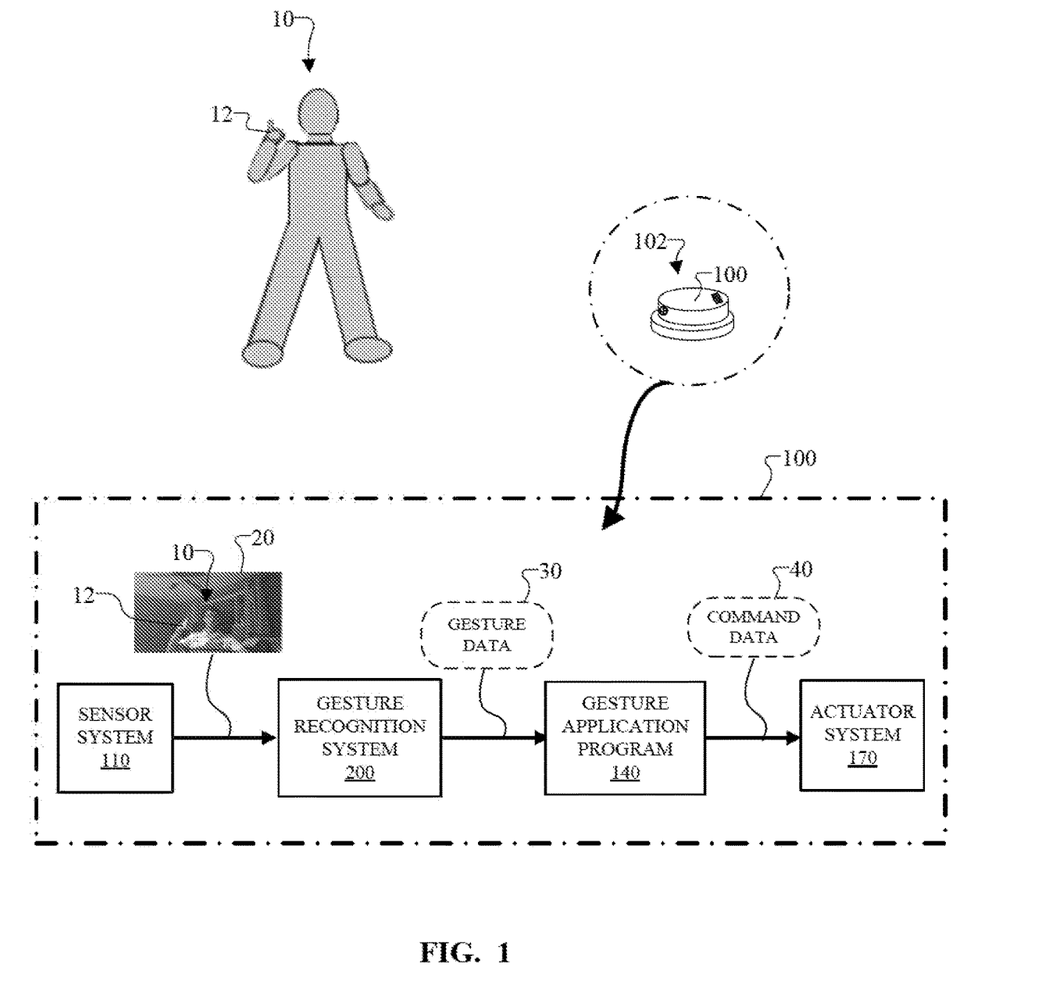
FIG. 1 is a diagram of an example of an application of a system with a gesture recognition system according to an example embodiment of this disclosure.

FIG. 1 is a diagram of an example of an application of a system 100, which includes a gesture recognition system 200, according to an example embodiment. In FIG. 1, the system 100 is applied to a robot 102, which is controlled via the gesture recognition system 200. In this example, the robot 102 is configured to perform household tasks, such as vacuuming, floor cleaning tasks, etc. As shown in FIG. 1, the gesture recognition system 200 is configured to recognize gestures 12 of users 10 and control the robot 102 based on commands 40 corresponding to the recognized gestures 12. In this regard, the gesture recognition system 200 is advantageous in being able to provide an intuitive and touch-free interface for communicating with the robot 102 compared to other command modalities, such as phone app-based controls, remote controls, etc. The system 100 is advantageous in enabling users 10 to use gestures 12 to control or interact with the robot 102 from a distance without requiring the users 10 to physically touch that robot 102 or another device (e.g., remote control, phone-app based controls, etc.).

In FIG. 1, the robot 102 is configured to be controlled based on a gesture 12 of a user 10. More specifically, the robot 102 includes an onboard sensor system 110, which is configured to capture sensor data 20 that includes a gesture 12. In this example, the robot 102 includes an onboard camera, which captures a sequence or stream of digital images (e.g., digital video data) of the gesture 12 being performed by the user 10. The gesture recognition system 200 is configured to generate gesture data 30 in response to receiving the sensor data 20 (e.g., digital video data) as input. In addition, the gesture application program 140 is configured to determine a command data 40 for controlling the robot 102 based on the gesture data 30 and provide the command data 40 to the actuator system 170 for execution. For example, in FIG. 1, when the user 10 provides the "thumbs up" gesture 12, the robot 102 is configured to capture sensor data 20 (e.g., video data) of the user 10 performing the gesture 12. In this non-limiting example, the robot 102 is configured to recognize the "thumbs up" gesture 12 of the sensor data 20, generate gesture data 30 indicative of the "thumbs-up" gesture 12, and associate the "thumbs up" gesture data 30 with a command data 40, which includes instructions for the robot 102 to return to its base. This command data 40 (e.g., instructions indicative of "return to base") is then provided to one or more actuators of the actuator system 170. Upon receiving this command data 40, the actuator system 170 is configured to move the robot 102 to its base. As discussed in this example, the system 100 allows users 10 to use one or more gestures 12 to interact with and control the robot 102 in an easy and touch-free manner.

TABLE 1 provides non-limiting examples of gesture data 30 indicative of gestures 12 and corresponding commands 40 for controlling the robot 102 of FIG. 1. The gesture recognition system 200 may include more gesture data 30, less gesture data 30, or different gesture data 30 than the gesture data 30 of TABLE 1. Also, the gesture application program 140 may include more commands 40, less commands 40, or different commands 40 than those commands 40 of TABLE 1. The robot 102 may include a mapping of gesture data 30 to commands 40 that is different than the mapping of TABLE 1. In this regard, the robot 102 and/or system 100 is not limited to the control implementation of TABLE 1.

TABLE 1

| GESTURE DATA | COMMAND DATA EXECUTED BY ROBOT |
| --- | --- |
| THUMBS UP | RETURN TO BASE |
| CROSS FINGERS | CANCEL CURRENT JOB |
| PINCH (ZOOM IN, ZOOM OUT) | CONTROL VACUUM SUCTION POWER |
| WAVE HAND | WAKE ROBOT AND SUMMON IT NEAR PERSON |
| SWIPE FORWARD/ BACKWARD | MOVE ROBOT FORWARD/ BACKWARD |
| WAVE 2 FINGERS | ACTIVATE A 'FOLLOW PERSON' MODE |

As aforementioned, FIG. 1 provides a non-limiting example of one illustrative application (e.g., robot 102 application) of the system 100, which includes the gesture recognition system 200. However, the system 100 and/or the gesture recognition system 200 may be applied to other technologies. As other non-limiting examples, the gesture recognition system 200 may be applied to a warehouse robot, a home appliance, a car media system, any technological device, or any number and combination thereof. Furthermore, other technological applications may become apparent based on this disclosure.

Figure 2:
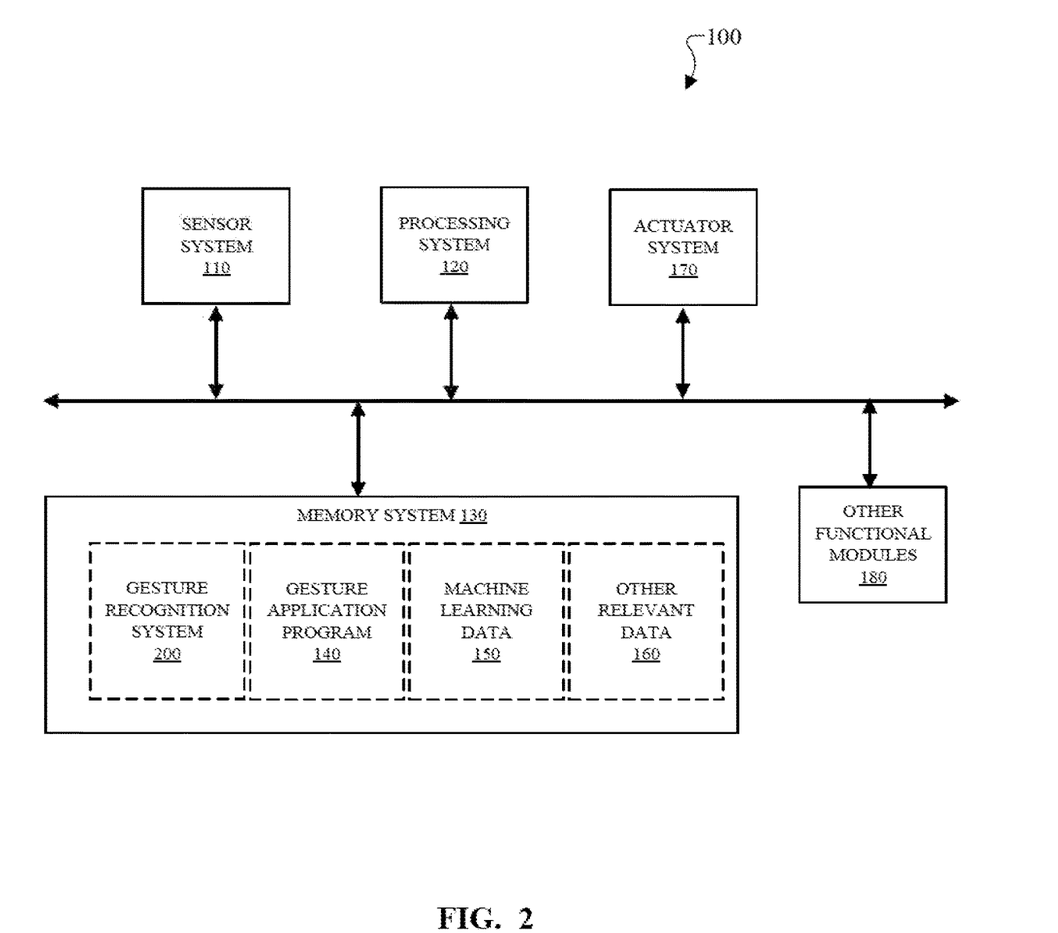
FIG. 2 is a block diagram of an example of a system with a gesture recognition system according to an example embodiment of this disclosure.

FIG. 2 is a block diagram of an example of the system 100 according to an example embodiment. The system 100 is configured to generate gesture data 30 based on the sensor data 20. In addition, the system 100 is configured to control one or more actuators based on one or more commands 40 that correspond to the gesture data 30. More specifically, as shown in FIG. 2, the system 100 is configured to include at least one sensor system 110. The sensor system 110 is local, remote, or a combination thereof (e.g., partly local and partly remote). The sensor system 110 includes one or more sensors. For example, the sensor system 110 may include an image sensor, a camera, a depth sensor, a Time of flight (ToF) sensor, a structured light sensor (e.g., a LIDAR sensor), an infrared sensor, any suitable sensor, or any number and combination thereof.

The sensor system 110 is configured to generate, capture, and/or provide sensor data 20. The sensor data 20 may include a gesture 12, which is being performed by a gesturer or user 10. The sensor data 20 may include digital image data, a collection/stream of digital image data, video data, etc. The sensor data 20 may include depth data. The sensor data 20 may include ToF data, structured light sensor data, any suitable depth/surface data, or any number and combination thereof. The processing system 120 may receive infrared data, any applicable sensor data, or any number and combination thereof. The sensor data or a combination of different sensor data (e.g., sensor-fusion data) may be further processed to generate a digital image or a sequence/stream of digital images data (e.g., video data). For instance, as a non-limiting example, the sensor data 20 may include (i) red green blue (RGB) video, (ii) depth data, (iii) RGB video and depth data, (iv) infrared (IR) video, or (v) IR video and depth data. The sensor system 110 is operable to communicate with one or more other components (e.g., processing system 120 and memory system 130) of the system 100. For example, the sensor system 110 is configured to transmit and/or provide sensor data 20 to the processing system 120.

The system 100 includes at least one processing system 120. The processing system 120 includes one or more processing devices. For example, the processing system 120 may include an electronic processor, a central processing unit (CPU), a graphics processing unit (GPU), a microprocessor, a field-programmable gate array (FPGA), an application-specific integrated circuit (ASIC), any suitable processing technology, or any number and combination thereof. The processing system 120 is operable to provide the functionality as described herein. The processing system 120 is configured to receive sensor data 20 (e.g., video data) from the sensor system 110 and process the sensor data 20 (e.g., video data) in connection with the gesture recognition system 200, the gesture application program 140, the machine learning data 150, the other relevant data 160, or any number and combination thereof.

The system 100 includes a memory system 130, which is configured to be in data communication with the processing system 120. The memory system 130 is configured to be in data communication with the sensor system 110 and may store sensor data 20 thereon. In an example embodiment, the memory system 130 includes at least one non-transitory computer readable storage medium, which is configured to store and provide access to various data to enable at least the processing system 120 to perform the operations and functionality, as disclosed herein. In an example embodiment, the memory system 130 comprises a single memory device or a plurality of memory devices. The memory system 130 may include electrical, electronic, magnetic, optical, semiconductor, electromagnetic, or any suitable storage technology that is operable with the system 100. For instance, in an example embodiment, the memory system 130 may include random access memory (RAM), read only memory (ROM), flash memory, a disk drive, a memory card, an optical storage device, a magnetic storage device, a memory module, any suitable type of memory technology, or any number and combination thereof. With respect to the processing system 120 and/or other components of the system 100, the memory system 130 is local, remote, or a combination thereof (e.g., partly local and partly remote). For example, the memory system 130 can include at least a cloud-based storage system (e.g. cloud-based database system), which is remote from the processing system 120 and/or other components (e.g., sensor system 110, actuator system 170, etc.) of the system 100.

The memory system 130 includes at least the gesture recognition system 200, the gesture application program 140, machine learning data 150, and other relevant data 160, which are stored thereon. The gesture recognition system 200 includes computer readable data with instructions that, when executed by the processing system 120, is configured to recognize various gestures 12 in sensor data 20 and generate gesture data 30 indicative of these recognized gestures 12. The gesture recognition system 200 is configured to generate gesture data 30 as output upon receiving sensor data 20 (e.g., digital video data, infrared data, etc.) as input. The computer readable data can include instructions, code, routines, various related data, any software technology, or any number and combination thereof. The gesture recognition system 200 includes a machine learning system, as shown and discussed with respect to FIG. 3 and FIG. 4. Also, the gesture application program 140 includes computer readable data with instructions, which, when executed by the processing system 120, is configured to apply the output of the gesture recognition system 200 to an application, such as one or more actuators of the actuator system 170. For example, as shown in FIG. 1, the gesture application program 140 may associate the gesture data 30 with one or more commands 40 and provide these commands 40 to the actuator system 170. In this regard, the gesture application program 140 is configured to provide a seamless integration of the gesture recognition system 200 with respect to one or more components of the system 100 in relation to the desired application (e.g., robot 102). In addition, the machine learning data 150 includes various data relating to the training and operation of the gesture recognition system 200 as described in this disclosure. For example, the machine learning data 150 includes training data, parameter data, loss data, embedding data, mean embedding data, embedding vector data, transformed vector data, distance data, sample data, sensor data (e.g., digital image/video data and depth data), any relevant data for the gesture recognition system 200, or any number and combination thereof. Meanwhile, the other relevant data 160 provides various data (e.g. operating system, etc.), which enables the system 100 to perform the functions as discussed herein.

The system 100 is configured to include an actuator system 170. The actuator system 170 includes one or more actuators for controlling an action (e.g., movement) of a device (e.g., robot 102) based on one or more control commands, which include at least gesture-based commands 40. The control commands may also include voice commands, app-based commands, remote control commands, any command mechanism, or any number and combination thereof. In addition, the one or more actuators may include a software component, an electrical/electronic component, a hardware component, an electromechanical component, a mechanical component, a computer component, or any number and combination thereof. As an example, for instance, in FIG. 1, the robot 102 includes at least a motion actuator, a control actuator, a brake actuator, etc. In this regard, the actuator system 170 includes one or more actuators, which are configured to provide one or more actions relating to advancing and/or executing the control commands of the system 100.

In addition, the system 100 may include at least one other component. For example, as shown in FIG. 2, the memory system 130 is also configured to store other relevant data 160, which relates to operation of the system 100 in relation to one or more components (e.g., sensor system 110, actuator system 170, and other functional modules 180). Also, the system 100 includes other functional modules 180, such as any appropriate hardware, software, or combination thereof that assist with or contribute to the functioning of the system 100. For example, the other functional modules 180 include communication technology (e.g. wired communication technology, wireless communication technology, or a combination thereof) that enables components of the system 100 to communicate with each other as described herein. In addition, the other functional modules 180 include one or more I/O devices (e.g., display device, keyboard device, speaker device, etc.), which relate to the system 100. In this regard, the system 100 is operable to perform gesture recognition, as described herein, to control one or more devices (e.g., one or more actuators of the actuator system 170), which may include software components, hardware components, mechanical components, electrical components, or any number and combination thereof.

Figure 3:
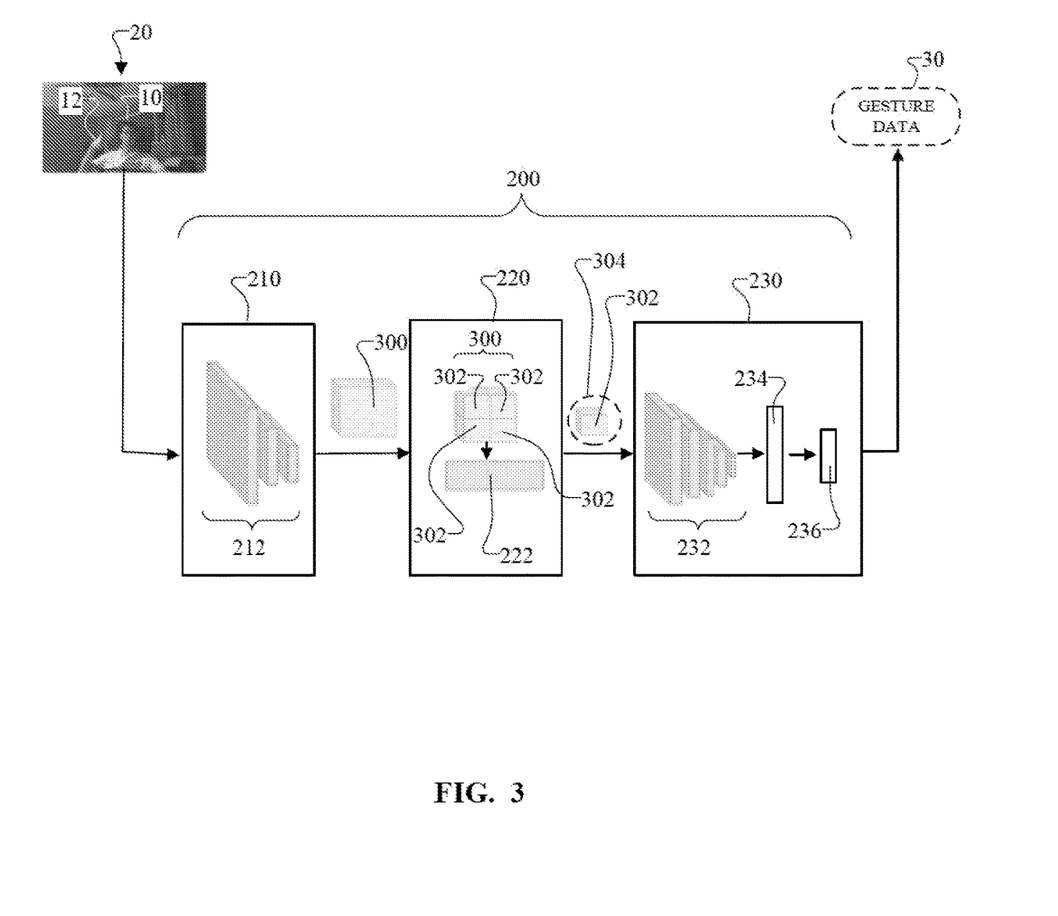
FIG. 3 is a block diagram of an example of a gesture recognition system according to an example embodiment of this disclosure.
Figure 4:
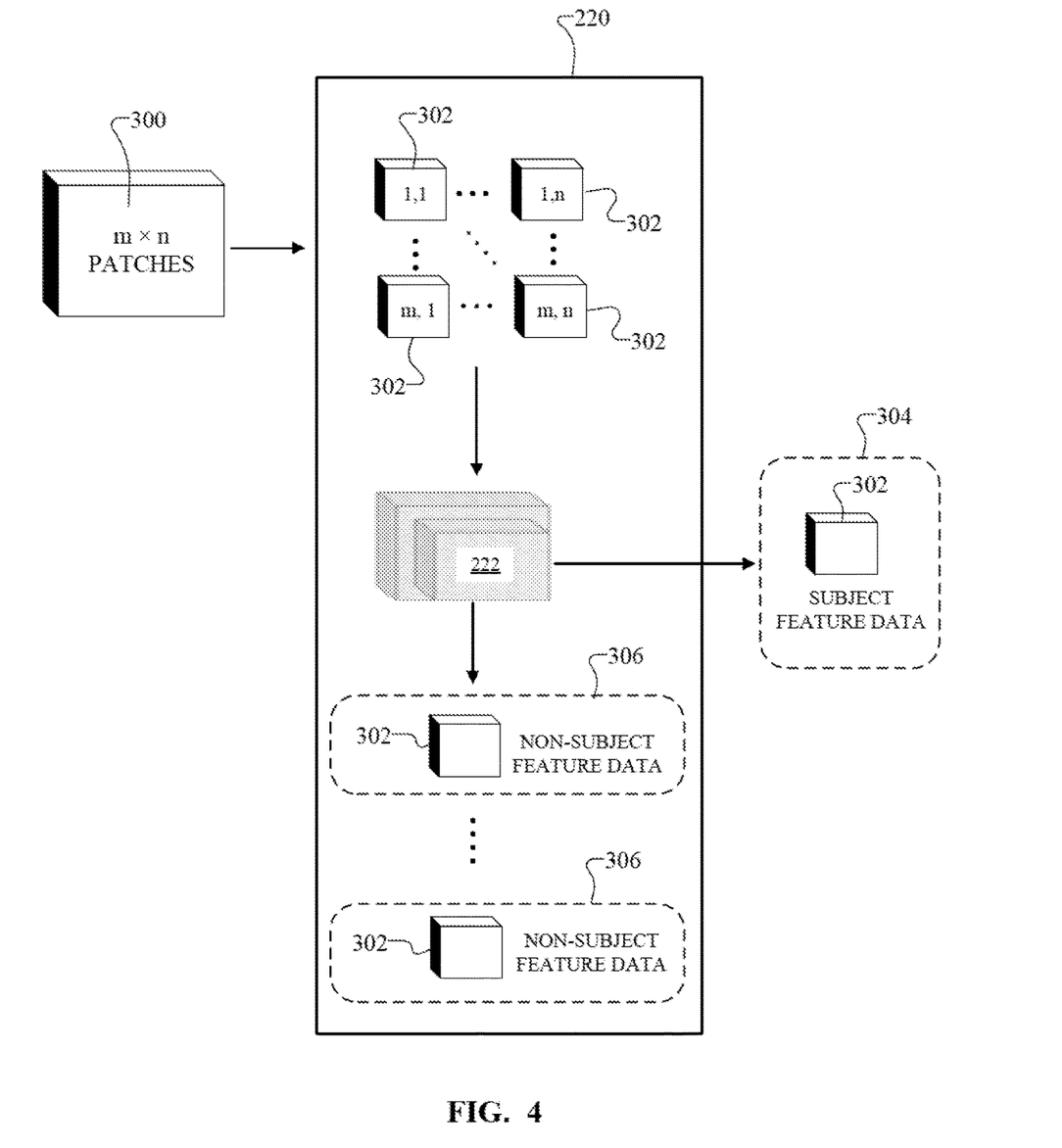
FIG. 4 is a block diagram of an example of a patch selector according to an example embodiment of this disclosure.

FIG. 3 and FIG. 4 are block diagrams that illustrate aspects of the gesture recognition system 200 according to an example embodiment. The gesture recognition system 200 includes a machine learning system or a machine learning model. The machine learning system comprises a dynamic and artificial neural network model, which is trained end-to-end. The neural network model includes a first subnetwork, a second subnetwork, and a third subnetwork. The neural network model may include a different number of subnetworks provided that such modifications are similar to the spirit of the gesture recognition system 200 provided in this disclosure. During a training phase with an initial training dataset that include an initial set of gestures 12, the gesture recognition system 200 updates its parameters such that loss data of a loss function is minimized. For instance, as expressed in equation 1, the loss function is a sum of at least (i) a cross entropy loss defined for patch selection and (i) a cross entropy loss defined for gesture classification. In equation 1, LOSS represents the loss of the gesture recognition system 200 (i.e., the neural network model). Also, in equation 1, $CE_1$ represents the cross entropy loss function that is evaluated with respect to patch selection, $CE_2$ represents the cross entropy loss function that is evaluated with respect to gesture classification, and $\lambda$ represents a weighting factor between the two losses (i.e., $CE_1$ and $CE_2$).

$$LOSS = CE_1 + \lambda CE_2 \quad [1]$$

The first subnetwork is a feature extractor 210. The feature extractor 210 is configured to receive the sensor data 20 (e.g., video data or both video data and depth data) as input and generate feature data 300 as output. The feature extractor 210 generates the feature data 300 based on the sensor data 20. The feature extractor 210 includes a set of artificial neural network layers 212. As an example, for instance, the feature extractor 210 may include two or more convolutional neural network (CNN) layers to extract features from the sensor data 20 and generate the feature data based on the extracted features. The number of CNN layers may be selected based on a desired level of extracted features. In addition, the first subnetwork is configured to provide the feature data 300 to the second subnetwork.

The second subnetwork includes a patch selector 220. The patch selector 220 is configured to receive feature data 300 from the feature extractor 210. Upon receiving the feature data 300, the patch selector 220 is configured to divide the feature data into a total of m×n patches, where m represents an integer number of patches along a first dimension (e.g., width dimension) of the feature data 300 and n represents an integer number of patches along a second dimension (e.g., length dimension) of the feature data 300. Each patch 302 comprises a corresponding part of the feature data based on the division of the feature data 300. Upon dividing the feature data 300 into patches 302, the patch selector 220 provides each patch 302 of feature data to a patch classifier 222. For example, in FIG. 3 and FIG. 4, the patch classifier 222 is a binary classifier, which includes a set of artificial neural network layers. For example, the patch classifier 222 includes CNN layers, recurrent neural network (RNN) layers, a transformer neural network, any suitable machine learning layers, or any number and combination thereof.

The patch classifier 222 is configured to classify feature data of a given patch 302 as having and/or being indicative of (i) subject data or (ii) non-subject data. The patch classifier 222 is configured to generate confidence scores based on the classification of feature data of each patch 302. The patch selector 220 is configured to select a patch 302 of feature data as output based on the confidence score. For example, in FIG. 3, the patch selector 220 selects a target patch having feature data, which is classified as subject data based on its confidence score being above a predetermined threshold and/or within a predetermined range. In this regard, the patch selector 220 selects a target patch with a high confidence or high probability that its feature data includes at least some subject data therein. The subject data refers to the feature data, which corresponds to a subject. In this case, the subject is defined to be the gesturing part (e.g., the hand) of a gesturer (e.g., user 10).

The patch selector 220 is configured to output each selected patch 304, which is classified by the patch classifier 222 as having the feature data corresponding to subject data. Each selected patch 304 may also be referred to as a target patch for having feature data that corresponds to subject data, which is the target data that the patch selector 220 seeks to provide to the gesture recognizer 230. In some cases, there may be more than one selected patch 304 of feature data that is classified as having subject data and transmitted to the third subnetwork. The patch selector 220 filters out the non-selected patches 306 of feature data such that the non-selected patches 306 are not provided to and/or handled by the third subnetwork. The patch selector 220 provides only the feature data of interest (e.g., subject data of the gesturing hand) to the third subnetwork via one or more selected patches 304. The patch selector 220 provides each selected patch 304 (i.e., each patch 302 classified as subject data) of feature data to the third subnetwork, and does not provide non-selected patches 306 (e.g., each patch 302 classified as non-subject data) to the third subnetwork.

The third subnetwork includes a gesture recognizer 230. The gesture recognizer 230 receives only each selected patch 304 of feature data as input from among the entire feature data 300, which is generated by the feature extractor 210. The gesture recognizer 230 does not receive the non-selected patches 306 of feature data. In this regard, the patch selector 220 reduces the amount of feature data from the entirety of feature data 300, which is output by the feature extractor 210, to only one or more selected patches 304 of feature data such that the amount of feature data that is handled by the gesture recognizer 230 is significantly reduced to features of interest (i.e., gesturing part such as a hand or the like). In this regard, the patch selector 220 ensures that the gesture recognizer 230 only classifies feature data, which is classified as including subject data (e.g., gesturing part, such as a hand, body, face, leg, foot, etc.) while relieving the gesture recognizer 230 of the burden of handling feature data, which is classified as non-subject data.

The gesture recognizer 230 includes a gesture classifier 232. The gesture classifier 232 includes a set of artificial neural network layers. For example, the gesture classifier 232 includes a set of CNN layers, RNN layers, a transformer neural network, any suitable machine learning layers, or any number and combination thereof. The gesture classifier 232 only classifies the feature data of each selected patch 304. The gesture classifier 232 does not handle the non-selected patches 306 from the set of patches. More specifically, the gesture classifier 232 is configured to classify the feature data of each selected patch 304 as belonging to a particular gesture class. Upon receiving a selected patch 304 of feature data as input, the gesture classifier 232 generates an embedding vector 234 to represent a classification of the gesture 12 identified in the selected patch 304 of feature data. The embedding vector 234 is indicative of the gesture class in which the gesture classifier 232 classified the feature data of the selected patch 304 (e.g., the target patch having feature data classified as subject data). In addition, the gesture recognizer 230 is configured to generate a gesture prediction vector 236 based on the embedding vector 234. In this example, the gesture prediction vector 236 represents a discrete probability distribution. For instance, if the gesture recognition system 200 is trained to recognize "N" gestures (where N represents an integer value greater than 0), then the gesture prediction vector 236 would be an N-dimensional vector. As a non-limiting example, if the gesture recognition system 200 recognizes five gestures, then N=5 and the gesture prediction vector 236 is a 5-dimensional vector, such as the non-limiting example of P=[0.8, 0.05, 0.05, 0.09, 0.02]. In addition, the gesture recognizer 230 is configured to generate gesture data 30 based on the gesture prediction vector 236. The gesture data 30 identifies the gesture 12 and/or is indicative of the gesture 12. For example, in FIG. 3, the gesture recognition system 200 is configured to output "thumbs up" as the gesture data 30 in response to receiving the sensor data 20 (e.g., video data) of the user 10 performing the gesture 12 as input. In this regard, the gesture recognizer 230 is configured to classify the feature data (containing the subject data, such as a gesture 12 of gesturing hand) of the selected patch 304 as belonging to a particular gesture class (e.g., thumbs-up gesture class) and provide corresponding gesture data 30 (e.g., thumbs-up data) for that particular gesture class.

Figure 5:
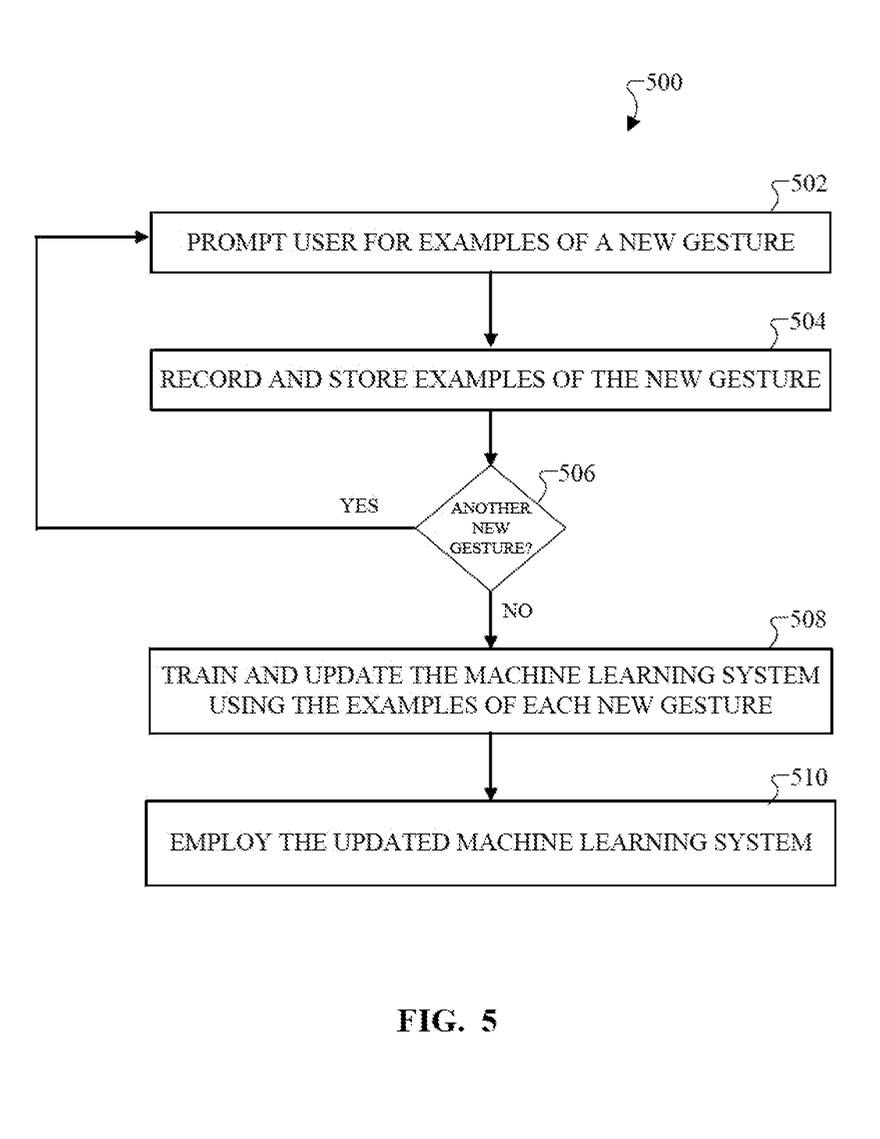
FIG. 5 is a flow diagram of an example of a process for adding new gestures to a gesture recognition system during test time according to an example embodiment of this disclosure.

FIG. 5 is a flow diagram of an example of a process 500 relating to continual learning of the gesture recognition system 200 according to an example embodiment. More specifically, the process 500 relates to adding one or more new gestures to the gesture recognition system 200 during test time and/or inference. With this process 500, the gesture recognition system 200 is not limited to the existing gestures that the gesture recognition system 200 learned during its training with the initial training dataset. The process 200 is advantageous in providing the gesture recognition system 200 with the capability to learn to recognize more gestures and/or new gestures, which are different from the existing gestures 12 that have already been learned by the gesture recognition system 200. The process 500 is performed by one or more processors of the processing system 120 together with the gesture recognition system 200 and the machine learning data 150. The gesture application program 140 may also be involved in the process 500. As a non-limiting example, the process 500 may be performed on the device itself (e.g., the robot 102), a cloud network, another device (e.g., mobile phone of user 10) that communicates with the device (e.g., robot 102), etc. The process 500 may include more steps or less steps than that shown in FIG. 5 provided that such modification provides similar functionalities and objectives as described in this disclosure.

At step 502, according to an example, the system 100 prompts a user 10 for examples of a new gesture. The system 100 is configured to prompt a user 10 via a graphical user interface, an audio prompt, a visual prompt, any prompting mechanism, or any number and combination thereof. After prompting the user 10 for examples of a new gesture, the system 100 performs step 504.

At step 504, according to an example, the system 100 records and stores the examples (or the samples) of the new gesture in the memory system 130. For example, the system 100 is configured to capture and record sensor data 20 (e.g., video data) of a user 10 performing the new gesture. The system 100 proceeds to capture a predetermined number of new samples of this new gesture. Once the predetermined number of new samples has been reached for this new gesture, then the system 100 performs step 506.

At step 506, according to an example, the system 100 determines whether or not there is another new gesture for the gesture recognition system 200 to learn at this time. The system 100 may make this determination by information that is provided by the user 10 with respect to the number of new gestures, which will be added during this iteration of the process 500. If there is another new gesture for the gesture recognition system 200, then the process 500 proceeds to step 502. If there are no other new gestures for the gesture recognition system 200, then the process proceeds to step 508.

At step 508, according to an example, the system 100 trains the gesture recognition system 200 using the examples of each new gesture, which were recorded and stored at step 504. In addition, the system 100 is configured to minimize loss data to increase a distance (or a separation) between a mean embedding of a new gesture relative to each mean embedding of each existing gesture without significantly perturbing each mean embedding of each existing gesture. In this regard, the system 100 considers an existing gesture to be a gesture 12 that the gesture recognition system 200 already recognizes via any prior training that occurred before that instance, such as the initial training with the training dataset, a prior iteration of process 500, a prior iteration of process 700, or any number and combination thereof. The system 100 is also configured to minimize a distance (or a separation) between embeddings of examples belonging to a same, new gesture.

For example, the system 100 is configured to compute loss data via a novel loss function such that the Loss=−(Sum of distances between mean embeddings of new gestures and mean embeddings of existing gestures, respectively)+(average distance between embeddings of stored examples of a gesture and the mean embedding of that same gesture, wherein the average distances are summed for all gestures). In this regard, this novel loss function (i) takes a negative of the first distance term and (ii) adds the second distance term to the first distance term, where the first distance term refers to "(Sum of distances between mean embeddings of new gestures and mean embeddings of existing gestures, respectively)" and the second distance term refers to "(average distance between embeddings of stored examples of a gesture and the mean embedding of that same gesture, wherein the average distances are summed for all gestures)," respectively.

The first distance term is computed by calculating a first total. As an example, the first total includes, for instance, summing a first distance sum for a first new gesture, a second distance sum for a second new gesture, . . . and so forth until an $i^{th}$ distance sum for the $i^{th}$ new gesture, where "r" represents the total number of new gestures. A $j^{th}$ distance sum is computed, for instance, by calculating a sum of a distance between a mean embedding of a $j^{th}$ new gesture and a mean embedding of a first existing gesture, a distance between a mean embedding of that same $j^{th}$ new gesture and a mean embedding of a second existing gesture, . . . and so forth until a distance between a mean embedding of that same $j^{th}$ new gesture and a mean embedding of an $s^{th}$ existing gesture, where "j" represents an integer value such that $1 \leq j \leq r$ for the new gestures, and where "s" represents the total number of existing gestures. In this regard, the first distance term considers distances between mean embeddings of new gestures and mean embeddings of existing gestures, respectively.

The second distance term is computed by calculating a second total. The second total considers both the new gestures and the existing gestures. As an example, the second total is computed, for instance, by calculating a sum of an average distance of a first gesture, an average distance of a second gesture, . . . and so forth until an average distance of the last gesture of the complete set of gestures (i.e., new gestures and existing gestures). The average distance of a kth gesture is computed, for instance, by calculating an average based on a distance between an embedding of a first stored example of a kth gesture and a mean embedding of that same kth gesture, a distance between an embedding of a second stored example of that same kth gesture and the same mean embedding of that same kth gesture, . . . and so forth until a distance between an embedding of the last stored example of that same kth gesture and the same mean embedding of that same kth gesture, where k represents an integer value such that $1 \leq k \leq (r+s)$ for all gestures (e.g., new gestures and existing gestures).

For example, equation 2 expresses this novel loss function as LOSS using $\ell_2$ distances, as indicated below. More specifically, when considering equation 2 with respect to the novel loss function discussed above, "$\Sigma_{i=1}^{s} \Sigma_{j=1}^{r} |\bar{y}_j - \bar{x}_i|_2$" may be considered to represent the first distance term while "$\lambda_1 \Sigma_{i=1}^{s} \Sigma_{q=1}^{p} |\bar{x}_i - x_{i,q}|_2 + \lambda_1 \Sigma_{j=1}^{r} \Sigma_{q=1}^{p} |\bar{y}_j - y_{j,q}|_2$" may be considered to be the second distance term. In equation 2, $\bar{x}_i$ represents a mean embedding of the i-th existing gesture while $\bar{y}_j$ represents a mean embedding of the j-th new gesture. In this regard, "i" represents an integer value such that $1 \leq i \leq s$ for the existing gestures, and r represents an integer value such that $1 \leq j \leq r$ for the new gestures. Also, $x_{i,q}$ is the q-th stored example of the i-th existing gesture and $y_{j,q}$ is the q-th stored example of the j-th new gesture. In addition, "p" represents the number of examples stored for each of the s existing gestures and r new gestures. As an example, $|x|_2$ denotes the $\ell_2$ distance, which is an example of a distance that may be used by the system 100. Additionally or alternatively to the $\ell_2$ distances of equation 2, the system 100 is configured to compute the novel loss function using other distance computations to calculate distances between the corresponding variables (e.g., $\bar{x}_i$, $\bar{y}_j$, $x_{i,q}$, and $y_{j,q}$). $\lambda_1$ is a hyperparameter used to decide the relative importance and/or weightage given to the first loss term and the second loss term.

$$\text{LOSS} = -\Sigma_{i=1}^{s} \Sigma_{j=1}^{r} |\bar{y}_j - \bar{x}_i|_2 + \qquad [2]$$
$$\lambda_1 \Sigma_{i=1}^{s} \Sigma_{q=1}^{p} |\bar{x}_i - x_{i,q}|_2 + \lambda_1 \Sigma_{j=1}^{r} \Sigma_{q=1}^{p} |\bar{y}_j - y_{j,q}|_2$$

The system 100 uses this novel loss function (e.g., equation 2) to ensure that the embeddings for existing classes remain roughly intact while also ensuring that the embeddings associated with the new samples of a new gesture class form its own cluster in the embedding space. The system 100 is configured to ensure that each example of a gesture is predicted based on its closeness to the cluster of embeddings associated with its gesture class and its corresponding mean embedding of that same gesture class in the embedding space. The system 100 ensures that the new embeddings of a new gesture are spaced away (or distinguishable) from each cluster of embeddings of each existing gesture class. Also, after training and/or updating the gesture recognition system 200, the system 100 stores (i) the mean embedding associated with each new gesture and (ii) the few examples of each new gesture. This information relating to the new gestures is stored in the memory system 130 similarly to the information relating to the existing gestures. In addition, the system 100 updates parameters of the gesture recognition system 200 based on loss data associated this additional training of the gesture recognition system 200 based on the new examples of each new gesture.

At step 510, according to an example, the system 100 provides or outputs the updated gesture recognition system 200 for deployment and/or employment. The gesture recognition system 200 is configured to generate gesture data 30 indicative of a new gesture class, which was learned during the process 500, as output in response to receiving sensor data 20 (e.g., video data) with the new gesture as input. In this regard, the gesture recognition system 200 is now configured to recognize each new gesture (and generate gesture data 30 indicative of each new gesture 12) in addition to being able to recognize the existing gestures (and generate gesture data 30 indicative of each existing gesture 12).

As discussed above, the gesture recognition system 200 is configured to learn one or more new gestures after having been trained with an initial training dataset that includes an initial set of gestures. That is, the gesture recognition system 200 is configured to learn one or more new gestures during test time and/or during inference. The gesture recognition system 200 learns to recognize a new gesture by being trained on just a number of examples (e.g., a few samples) of that new gesture. The gesture recognition system 200 does not require retraining of the network on a full training dataset to learn new gestures. Instead, the gesture recognition system 200 generates a mean embedding vector for a particular gesture based on the set of embedding vectors, which are generated by the gesture recognition system 200 (e.g., gesture recognizer 230) based on selected patches of feature data of that particular gesture. The gesture recognition system 200 is configured to store (or save in the memory system 130) only the mean embedding vector for each gesture that has been learned by the gesture recognition system 200. Additionally, the gesture recognition system 200 is configured to store a number of videos as samples of each gesture from the training dataset.

Figure 6:
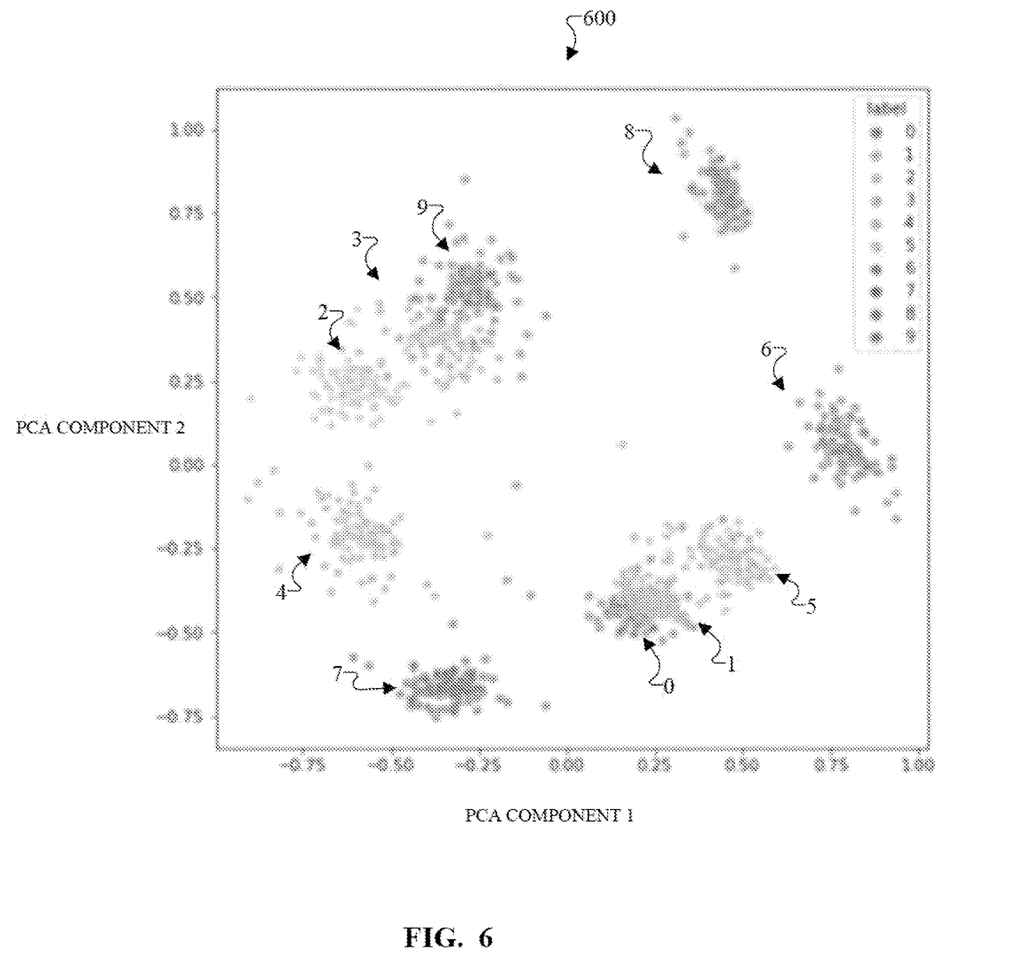
FIG. 6 is a diagram of an example of an embedding space with embeddings corresponding to gestures of a gesture recognition system according to an example embodiment of this disclosure.

FIG. 6 is a diagram of an example of a graphical visualization 600 of a principal component analysis (PCA). More specifically, FIG. 6 shows a non-limiting example of a representation of an embedding space between the x-axis and y-axis. Also, FIG. 6 also shows a legend in the upper, right corner of the graphical visualization. The legend shows a mapping of different colored dots, which refer to different embedding vectors, with respect to different numbered labels, which refer to different gesture classes (e.g., different gesture data 30). However, since the PCA may be shown in black and white according to drawing requirements, the graphical visualization 600 further includes numbered labels adjacent to the clusters to indicate their corresponding colors, as indicated in the legend.

As previously discussed, the gesture recognition system 200 is configured to generate embedding vectors 234 in an embedding space such that embedding vectors 234 corresponding to examples that belong to the same gesture are generally clustered together. In addition, the gesture recognition system 200 is configured such that embedding vectors 234 of examples of one gesture are generally spaced away from other embedding vectors 234 of other examples of other gestures. For example, FIG. 6 shows embedding vectors of a first gesture (label 0, red) forming a first cluster, embedding vectors of a second gesture (label 1, orange) forming a second cluster, embedding vectors of a third gesture (label 2, yellow) forming a third cluster, embedding vectors of a fourth gesture (label 3, light green) forming a fourth cluster, embedding vectors of a fifth gesture (label 4, green) forming a fifth cluster, embedding vectors of a sixth gesture (label 5, light blue) forming a sixth cluster, embedding vectors of a seventh gesture (label 6, blue) forming a seventh cluster, embedding vectors of an eighth gesture (label 7, purple) forming an eighth cluster, embedding vectors of a ninth gesture (label 8, light magenta) forming a ninth cluster, embedding vectors of a tenth gesture (label 9, dark magenta) forming a tenth cluster.

Figure 7:
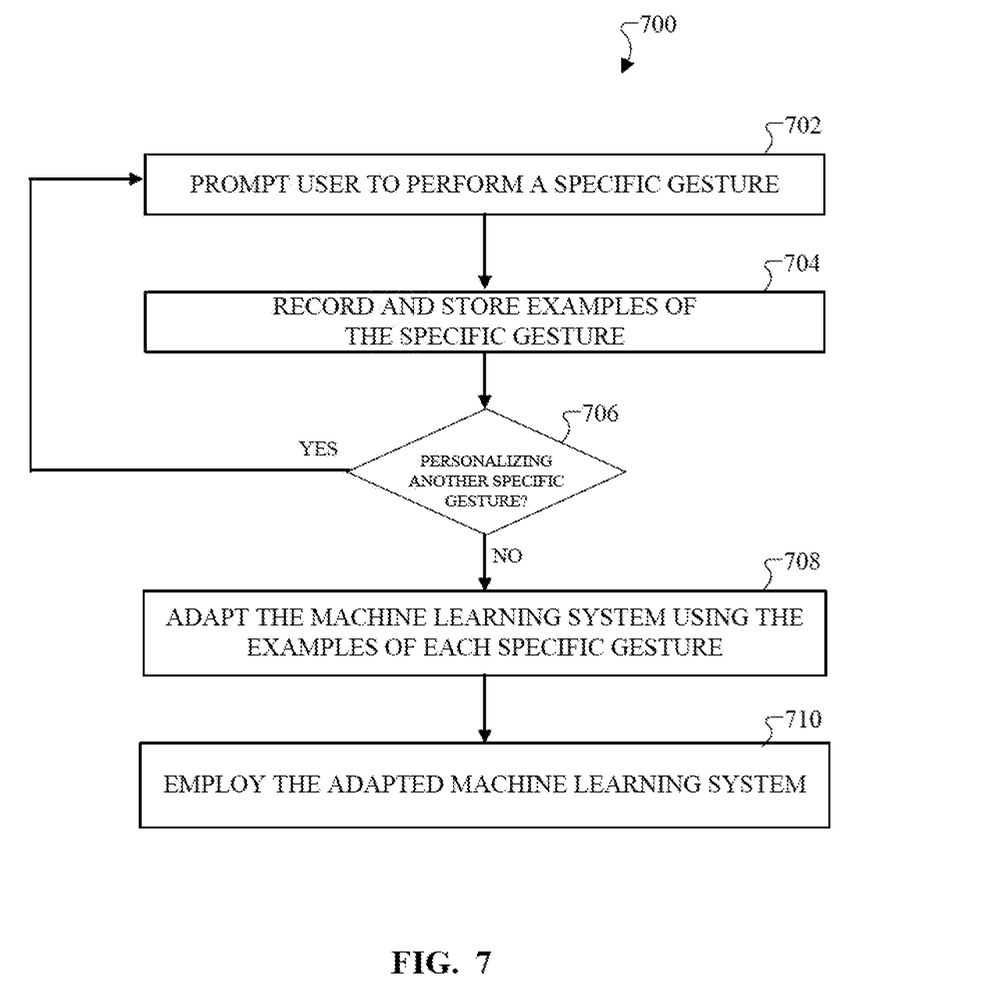
FIG. 7 is a flow diagram of an example of a process of adapting a gesture recognition system to one or more gestures of a new domain during test time according to an example embodiment of this disclosure.

FIG. 7 is a diagram of an example of a process 700 relating to continual learning of the gesture recognition system 200 according to an example embodiment. More specifically, the process 700 relates to adapting the gesture recognition system 200 to a new domain during test time and/or during inference. The process 700 ensures that the gesture recognition system 200 adapts the existing gestures, which was already learned, for example, to the shape of a user's gesturing part (e.g., shape of a user's hand), the appearance of the gesturing part (e.g., appearance of a user's hand), or the performance of a user's style of carrying out the gesture 12. The user 10 may be a new user of the gesture recognition system 200. The user 10 may be an existing user of the gesture recognition system 200 in which there has been some change, for example, to the shape of the user's gesturing part (e.g., shape of a user's hand), the appearance of the user's gesturing part (e.g., appearance of a user's hand), or the performance of the user's style of carrying out the gesture 12. Adapting the gesture recognition system 200 to such inter-user variations helps improve gesture recognition for specific users. The process 700 is performed by one or more processors of the processing system 120 together with the gesture recognition system 200 and the machine learning data 150. The process 700 may also involve the gesture application program 140. As a non-limiting example, the process 500 may be performed on the device itself (e.g., the robot 102), a cloud network, another device (e.g., mobile phone of user 10) that communicates with the device (e.g., robot 102), etc. The process 700 may include more steps or less steps than that shown in FIG. 7 provided that such modifications provide similar functionalities and objectives as described in this disclosure.

At step 702, according to an example, the system 100 prompts a user 10 for examples of a specific gesture. The specific gesture refers to any one of the existing gestures, which the gesture recognition system 200 has already been trained to recognize prior to the current iteration of this process 700. The system 100 is configured to prompt a user 10 via a graphical user interface, an audio prompt, a visual prompt, any prompting mechanism, or any number and combination thereof.

At step 704, according to an example, the system 100 records and stores the examples of that specific gesture in the memory system 130. The system 100 proceeds to capture a predetermined number of new examples (or new samples) of the specific gesture. Once the predetermined number of samples of that specific gesture has been captured, then the process 700 proceeds to step 706.

At step 706, according to an example, the system 100 determines whether or not there is another specific gesture to personalize. If there is another specific gesture to personalize, then the process 700 proceeds to step 702. If there isn't another specific gesture to personalize, then the process 700 proceeds to step 708.

At step 708, according to an example, the system 100 trains the gesture recognition system 200 using the examples of each specific gesture, which were recorded and stored at step 704. During this training, the system 100 uses test time entropy minimization to adapt the gesture recognition system 200 to the new domain. More specifically, for example, the system 100 is configured to generate a transformed embedding vector ("y") by performing an affine transformation on the embedding vector 234 (i.e., "x" that is extracted from the last neural network layer, e.g. CNN layer, of the gesture recognizer 230) with parameters (e.g., parameter $\alpha$ and parameter $\beta$) such that the transformed embedding vector "y" can be defined as y=$\alpha$x+$\beta$. In this example, the parameters are set such that $\alpha$=1 and $\beta$=0. Also, when training with the new examples of each specific gesture, the gesture recognition system 200 is configured to use the transformed embedding vector ("y") in place of the embedding vector 234. In addition, the system 100 generates loss data by minimizing a loss function with respect to all of the examples of each specific gesture obtained from the user 10 at step 704. In this example, the loss function is a Shannon entropy loss function associated with the gesture recognizer 230. For instance, the loss function may be represented as LOSS, as expressed in equation 3.

$$\text{LOSS} = -\sum\nolimits_{i=1}^{M}\sum\nolimits_{j=1}^{N} f(y_i)_j \log(f(y_i)_j) \qquad [3]$$

In equation 3, $y_i$ represents the transformed embedding vector such that $y_i = \alpha x_i + \beta$, where $x_i$ represents the embedding vector ("x") of the i-th example of an existing gesture (or the specific gesture), which is performed by the user 10. Here, f($y_i$) represents the gesture prediction vector 236 (i.e., the probability distribution) associated with the transformed embedding vector $y_i$. Also, f($y_i$)$_j$ is the probability that $y_i$ is classified as the j-th gesture (which the gesture recognition system 200 had already been trained to recognize via previous training). In equation 3, M represents the total number of examples of the existing gesture (or the specific gesture), which is performed by the user 10 while N represents the total number of gestures that the gesture recognition system 200 is configured to recognize.

In addition, the system 100 updates parameter $\alpha$ and parameter $\beta$ of the gesture recognizer 230 using this loss data, which is based on the additional training of the gesture recognition system 200 with the new examples of each specific gesture. In this regard, parameter α and parameter β are learned by the gesture recognition system 200 while the rest of the weights of the gesture recognition system 200 are frozen. After obtaining and updating the values for parameter α and parameter β while also updating y in place of x, the gesture recognition system 200 is updated and adapted to that user 10.

At step 710, according to an example, the processing system 120 provides or outputs the updated gesture recognition system 200 for deployment and/or employment. The gesture recognition system 200 is now adapted to this new domain and configured to generate gesture data 30 as output upon receiving sensor data 20, which includes an existing gesture from this new domain (e.g. the new user) as input.

As described in this disclosure, the gesture recognition system 200 provides a number of advantages and benefits. For example, the gesture recognition system 200 comprises a novel and dynamic neural network, which is configured to recognize gestures with greater accuracy at longer distances than other systems with similar compute complexity by narrowing down the feature data 300 to a selected patch 304 (or a target patch), which contains the features of interest, for gesture classification. The gesture recognition system 200 is advantageous with respect to its dynamic neural network architecture, continual learning techniques, and domain adaptation techniques.

The gesture recognition system 200 is advantageously structured as a single neural network model, which is trained end-to-end. The gesture recognition system 200 is more efficient than two-stage systems, which comprise two different networks in two different stages. For example, two-stage systems need to train the first network separately from the second network. Also, two-stage systems typically require sensor data as input at both the first stage involving the first network and the second stage involving the second network, thereby increasing processing time. In contrast, the gesture recognition system 200 performs inference faster than similarly sized two-stage systems due to the shared features used by the patch selector 220 and the gesture recognizer 230. The gesture recognition system 200 also performs faster than two-stage systems as the gesture recognizer 230 only handles and classifies each selected patch 304 of feature data, thereby significantly reducing the workload of the gesture recognizer 230 and enabling the gesture recognizer 230 to focus on features of interest (i.e., feature data corresponding to the subject data, such as a gesturing hand).

The gesture recognition system 200 is advantageously configured with a first subnetwork comprising a feature extractor 210, a second subnetwork comprising a patch selector 220, and a third subnetwork comprising a gesture recognizer 230. The feature extractor 210 provides the patch selector 220 with feature data 300. The feature data 300 is divided into a set of patches 302. Each patch 302 is provided as input into a patch classifier 222 of the patch selector 220. The patch selector 220 is dynamically configured to select a target patch as the feature data of interest (e.g., feature data corresponding to subject data such as a hand) for the gesture recognizer 230 to receive as input while filtering out other patches 302 (i.e., patches of feature data corresponding to non-subject data) so that the gesture recognizer 230 does not handle the feature data of these other patches 302. The gesture recognizer 230 is therefore configured to classify the feature data of interest (e.g. the selected patch 304 of feature data corresponding to subject data such as a hand) while not being burdened with the task of classifying the other non-selected patches 306 (e.g. feature data classified as non-subject data).

The gesture recognition system 200 is configured to use higher resolution input video compared to other similarly sized networks. By providing the feature extractor 210 at the onset, the gesture recognition system 200 benefits from a reduction in the size of features passing through the rest of the neural network layers (e.g., neural network layers of the patch selector 220 and the neural network layers of the gesture recognizer 230) with no compromise on resolution unlike pooling. With its neural network architecture, the gesture recognition system 200 is configured to perform the task of gesture recognition accurately with a relatively low compute complexity.

In addition, the gesture recognition system 200 performs continual learning using novel techniques. For example, the gesture recognition system 200 is configured to learn new gestures using only a few examples without requiring the gesture recognition system 200 to be retrained with its entire dataset of training data. In addition, the gesture recognition system 200 is configured to be personalized to the gestures of one or more users 10. The gesture recognition system 200 is configured to adapt to a new domain (e.g., a new user performing the gesture 12 or a different style of performing the specific gesture 12) at test time. In addition, unlike other distance-based classifiers that do not retain knowledge of its initial trained classes when learning new classes, the gesture recognition system 200 is configured to retain knowledge of its initial trained gesture classes when learning new gesture classes.

Furthermore, the gesture recognition system 200 may be applied to various technologies to allow users 10 to use gestures to control these various technologies. For example, the gesture recognition system 200 may be applied to a warehouse robot, a home appliance, a car media system, any technological device, or any number and combination thereof. In this regard, the gesture recognition system 200 may be used to communicate with and convey instructions to various types of robots, various types of IoT devices, various televisions/screens, various appliances, various technologies benefiting from touch-free operations, or any number and combination thereof.

That is, the above description is intended to be illustrative, and not restrictive, and provided in the context of a particular application and its requirements. The present invention may be implemented in a variety of forms. In addition, various embodiments may be implemented alone or in combination. Therefore, while the embodiments of the present invention have been described in connection with particular examples thereof, the general principles defined herein may be applied to other embodiments and applications without departing from the spirit and scope of the described embodiments, and the true scope of the embodiments and/or methods of the present invention are not limited to the embodiments shown and described, since various modifications will become apparent upon a study of the drawings, specification, and following claims. Additionally or alternatively, components and functionality may be separated or combined differently than in the manner of the various described embodiments, and may be described using different terminology. These and other variations, modifications, additions, and improvements may fall within the scope of the disclosure as defined in the claims that follow.

What is claimed is:

1. A computer-implemented method for a machine learning system to learn to recognize gestures, the computer-implemented method comprising:
training the machine learning system using a training dataset of sensor data that include a set of gestures, the training dataset including at least a first subset that displays a first gesture and a second subset that displays a second gesture;
generating loss data based on a first loss function that includes a first cross entropy loss and a second cross entropy loss;
updating parameters of the machine learning system based on the loss data; and
outputting the machine learning system for gesture recognition of the set of gestures,
wherein,
the machine learning system includes (i) a first subnetwork to generate feature data based on the sensor data, (ii) a second subnetwork to extract a selected patch of the feature data, and (iii) a third subnetwork to generate gesture data based on a classification of the corresponding feature data of the selected patch,
the first cross entropy loss is based on a first performance of the second subnetwork in relation to the training dataset, and
the second cross entropy loss is based on a second performance of third subnetwork in relation to the training dataset.

2. The computer-implemented method of claim 1, wherein the first subnetwork, the second subnetwork, and the third subnetwork form an artificial neural network model that is trained end-to-end.

3. The computer-implemented method of claim 1, further comprising:
receiving additional sensor data that include samples of a new gesture, the additional sensor data being received after the machine learning system has been trained on the training dataset;
training the machine learning system with the samples of the new gesture;
generating additional loss data via a second loss function based on the training of the machine learning system with respect to at least the samples of the new gesture, the second loss function being different from the first loss function; and
updating the parameters of the machine learning system based on the additional loss data.

4. The computer-implemented method of claim 3, wherein the second loss function is optimized such that the new gesture is associated with new embeddings that form a new cluster in an embedding space.

5. The computer-implemented method of claim 4, wherein the second loss function is optimized such that the new cluster of the new gesture is spaced away from at least (i) a first cluster of embeddings of the first gesture and (ii) a second cluster of embeddings of the second gesture.

6. The computer-implemented method of claim 1, further comprising:
receiving additional sensor data that include samples of the first gesture being performed by a new gesturer;
training the machine learning system using the samples to adapt the machine learning system to the new gesturer;
generating additional loss data via another loss function; and
updating affine parameters of the machine learning system based on the additional loss data.

7. The computer-implemented method of claim 6, further comprising:
generating, via the machine learning system, embeddings based on the samples;
generating output by performing affine transformations on the embeddings using the affine parameters when the machine learning system is being trained with the samples; and
generating the additional loss data based on the output, wherein the another loss function is a Shannon entropy loss function.

8. A system for gesture recognition comprising:
a processor; and
a non-transitory computer readable medium in data communication with the processor, the non-transitory computer readable medium having computer readable data including instructions stored thereon that when executed by the processor is configured to cause the processor to perform a method that comprises:
training a machine learning system using a training dataset of sensor data that include a set of gestures, the training dataset including at least a first subset that displays a first gesture and a second subset that displays a second gesture;
generating loss data based on a first loss function that includes a first cross entropy loss and a second cross entropy loss;
updating parameters of the machine learning system based on the loss data; and
outputting the machine learning system for gesture recognition of the set of gestures,
wherein,
the machine learning system includes (i) a first subnetwork to generate feature data based on the sensor data, (ii) a second subnetwork to extract a selected patch of the feature data, and (iii) a third subnetwork to generate gesture data based on a classification of the corresponding feature data of the selected patch,
the first cross entropy loss is based on a first performance of the second subnetwork in relation to the training dataset, and
the second cross entropy loss is based on a second performance of third subnetwork in relation to the training dataset.

9. The system of claim 8, wherein the first subnetwork, the second subnetwork, and the third subnetwork form an artificial neural network model that is trained end-to-end.

10. The system of claim 8, wherein the method further comprises:
receiving additional sensor data that include samples of a new gesture, the additional sensor data being received after the machine learning system has been trained on the training dataset;
training the machine learning system with the samples of the new gesture;
generating additional loss data via a second loss function based on the training of the machine learning system with respect to at least the samples of the new gesture, the second loss function being different from the first loss function; and
updating the parameters of the machine learning system based on the additional loss data.

11. The system of claim 10, wherein the second loss function is optimized such that the new gesture is associated with new embeddings that form a new cluster in an embedding space.

12. The system of claim 11, wherein the second loss function is optimized such that the new cluster of the new embeddings of the new gesture is spaced away from at least (i) a first cluster of embeddings of the first gesture and (ii) a second cluster of embeddings of the second gesture.

13. The system of claim 10, further comprising:
receiving additional sensor data that include samples of the first gesture being performed by a new gesturer;
training the machine learning system using the samples to adapt the machine learning system to the new gesturer;
generating additional loss data via another loss function; and
updating affine parameters of the machine learning system based on the additional loss data.

14. The system of claim 13, further comprising:
generating, via the machine learning system, embeddings based on the samples;
generating output by performing affine transformations on the embeddings using the affine parameters when the machine learning system is being trained with the samples; and
generating the additional loss data based on the output, wherein the another loss function is a Shannon entropy loss function.

15. A non-transitory computer readable medium having computer readable data including instructions stored thereon that, when executed by a processor, is configured to cause the processor to perform a method that comprises:
training a machine learning system using a training dataset of sensor data that include a set of gestures, the training dataset including at least a first subset that displays a first gesture;
generating loss data based on a first loss function that includes a first cross entropy loss and a second cross entropy loss;
updating parameters of the machine learning system based on the loss data; and
outputting the machine learning system for gesture recognition of the set of gestures,
wherein,
the machine learning system includes (i) a first subnetwork to generate feature data based on the sensor data, (ii) a second subnetwork to extract a selected patch of the feature data, and (iii) a third subnetwork to generate gesture data based on a classification of the corresponding feature data of the selected patch,
the first cross entropy loss is based on a first performance of the second subnetwork in relation to the training dataset, and
the second cross entropy loss is based on a second performance of third subnetwork in relation to the training dataset.

16. The non-transitory computer readable medium of claim 15, wherein the first subnetwork, the second subnetwork, and the third subnetwork form an artificial neural network model that is trained end-to-end.

17. The non-transitory computer readable medium of claim 15, further comprising:
receiving additional sensor data that include samples of a new gesture, the additional sensor data being received after the machine learning system has been trained on the training dataset;
training the machine learning system with the samples of the new gesture;
generating additional loss data via a second loss function based on the training of the machine learning system with respect to at least the samples of the new gesture, the second loss function being different from the first loss function; and
updating the parameters of the machine learning system based on the additional loss data.

18. The non-transitory computer readable medium of claim 17, wherein the second loss function is optimized such that the new gesture is associated with new embeddings that form a new cluster in an embedding space that is spaced away from at least a first cluster of embeddings of the first gesture.

19. The non-transitory computer readable medium of claim 15, further comprising:
receiving additional sensor data that include samples of the first gesture being performed by a new gesturer;
training the machine learning system using the samples to adapt the machine learning system to the new gesturer;
generating additional loss data via another loss function; and
updating affine parameters of the machine learning system based on the additional loss data.

20. The non-transitory computer readable medium of claim 19, further comprising:
generating, via the machine learning system, embeddings based on the samples;
generating output by performing affine transformations on the embeddings using the affine parameters when the machine learning system is being trained with the samples; and
generating the additional loss data based on the output, wherein the another loss function is Shannon entropy loss function.

* * * * *